(12) United States Patent
Agarwal et al.

(10) Patent No.: US 9,063,944 B2
(45) Date of Patent: Jun. 23, 2015

(54) MATCH WINDOW SIZE FOR MATCHING MULTI-LEVEL TRANSACTIONS BETWEEN LOG FILES

(71) Applicant: International Business Machines Corporation, Armonk, NY (US)

(72) Inventors: Manoj K. Agarwal, Noida (IN); Curt L. Cotner, Gilroy, CA (US); Amitava Kundu, Bangalore (IN); Prasan Roy, Bangalore (IN); Rajesh Sambandhan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/772,386

(22) Filed: Feb. 21, 2013

(65) Prior Publication Data

US 2014/0236976 A1 Aug. 21, 2014

(51) Int. Cl.
G06F 17/30 (2006.01)
G06F 9/46 (2006.01)

(52) U.S. Cl.
CPC .......... *G06F 17/30106* (2013.01); *G06F 9/466* (2013.01); *G06F 17/30368* (2013.01)

(58) Field of Classification Search
None
See application file for complete search history.

(56) References Cited

U.S. PATENT DOCUMENTS

| 7,028,301 | B2 | 4/2006 | Ding et al. |
| 7,110,540 | B2 | 9/2006 | Rajagopal et al. |
| 7,200,588 | B1 | 4/2007 | Srivastava et al. |
| 7,395,537 | B1 | 7/2008 | Brown et al. |
| 7,508,985 | B2 | 3/2009 | Van Lunteren |
| 7,523,123 | B2 | 4/2009 | Yang et al. |
| 7,548,652 | B1 | 6/2009 | Ahrens |
| 7,613,701 | B2 | 11/2009 | Zhao et al. |
| 8,121,978 | B2 | 2/2012 | Wiss et al. |
| 8,219,581 | B2 | 7/2012 | Roy et al. |
| 2003/0125931 | A1 | 7/2003 | Campbell |

(Continued)

FOREIGN PATENT DOCUMENTS

| WO | 03091872 A1 | 11/2003 |
| WO | 2008051855 A1 | 5/2008 |

OTHER PUBLICATIONS

Getting Started with IBM InfoSphere Optim Workload Replay for DB2, IBM RedBooks, whei-Jen Chen, Nisanti Mohanraj, Hassi Norlen, Leif Pedersen, Patrick Titzler, Tom Toomire, John Vonau, Jan. 2015.*

(Continued)

*Primary Examiner* — Robert Beausoliel, Jr.
*Assistant Examiner* — Hau H Hoang
(74) *Attorney, Agent, or Firm* — David Zwick; Terry J. Carroll (57) ABSTRACT

A predefined number of matches is identified between records in a first file and records in a second file. For the matches, determine the span of the actual range of record positions in the second file relative to the positions of the operation records in the first file within which all matches were found. If the actual span is smaller than the span of a current defined range of record positions by at least a first threshold value, decrease the span of the current defined range. If the actual span is within a second threshold value of the span of the current defined range, increase the span of the current defined range. If an amount above a third threshold value of operation records in the first file are not matched to operation records in the second file, increasing the span of the current defined range.

9 Claims, 5 Drawing Sheets

(56) References Cited

U.S. PATENT DOCUMENTS

| | | |
|---|---|---|
| 2003/0172198 A1 | 9/2003 | Tiwary et al. |
| 2004/0225631 A1 | 11/2004 | Elnaffar et al. |
| 2006/0026179 A1 | 2/2006 | Brown et al. |
| 2008/0222094 A1 | 9/2008 | Cox |
| 2009/0125514 A1 | 5/2009 | Brown |
| 2009/0182728 A1 | 7/2009 | Anderson |
| 2009/0287744 A1 | 11/2009 | Bernardini et al. |
| 2011/0055243 A1 | 3/2011 | Kunnummal |
| 2013/0325826 A1 | 12/2013 | Agarwal et al. |
| 2013/0325829 A1 | 12/2013 | Agarwal et al. |
| 2014/0115403 A1* | 4/2014 | Rhee et al. .................. 714/38.1 |

OTHER PUBLICATIONS

Performance Management Using IBM InfoSphere Optim Performance Manager and Query Workload Tuner, IBM RedBooks, Chuck Ballard, Ute Baumbach, Holly Hayes, Marcia Miskimen, Lakshmi Palaniappan, Marichu Scanlon, Yong Hua Zeng, Oct. 2013.*

SQL Ser's Trace and Replay Tool, Lori Brown, Oct. 20, 2011, http://sqlmag.com/database-performance-tuning/sql-servers-trace-and-replay-tool.*

Agarwal, M. et al. U.S. Appl. No. 13/483,778. May 30, 2012.

"Method for automatically using the result of automated log analysis to manage defects in the defects management system". IP.com PriorArtDatabase Technical Disclosure. IP.com No. IPCOM000198632D. IP.com Electronic Publication: Aug. 11, 2010.

Agarwal et al, "U.S. Appl. No. 13/733,452," filed Jan. 3, 2013, p. 1-41.

Agarwal et al, "U.S. Appl. No. 13/890,759," filed May 9, 2013, p. 1-41.

Agarwal et al, "U.S. Appl. No. 14/293,385," filed Jun. 2, 2014, p. 1-48.

Agarwal et al, "U.S. Appl. No. 14/317,136," filed Jun. 27, 2014, p. 1-61.

Cohen et al, "A Comparison of String Metrics for Matching Names and Records," American Association for Artificial Intelligence, 2003, AAAI.

Kirsten et al, "Data Partitioning for Parallel Entity Matching," Proceedings of the VLDB Endowment, 2010, vol. 3, No. 2, Conference on Very Large Data Bases, Sep. 13-17, 2010, Singapore.

Kolb et al, "Parallel Sorted Neighborhood Blocking with MapReduce," Department of Computer Science, University of Leipzig, Germany.

Wikipedia, "Sequence alignment," Last Revision on Aug. 17, 2011, Wikipedia: the free encyclopedia, Accessed at http://en.wikipedia.org/wiki/Sequence_alignment.

Wikipedia, "String searching algorithm," Last Revision on Aug. 7, 2010, Wikipedia: the free encyclopedia, Accessed at http://en.wikipedia.org/wiki/String_searching_algorithm.

Zou et al, "DVEMATCH: A Matching Algorithm for Distributed Virtual Environment," Advances in Mathematical and Computational Methods, Mar. 2012, vol. 2, No. 1.

U.S. Appl. No. 14/293,385, Office Action, Notification date Jan. 7, 2015.

U.S. Appl. No. 14/656,809, titled "Parallel Matching of Hierarchical Records," filed Mar. 13, 2015 (unpublished), 53 pages.

* cited by examiner

FIG. 4

MATCH WINDOW SIZE FOR MATCHING MULTI-LEVEL TRANSACTIONS BETWEEN LOG FILES

FIELD OF THE INVENTION

The present invention relates generally to identifying matching transaction records between log files in which the transaction element records are interleaved differently in each log file, and more particularly to dynamically adjusting a log file record window within which a transaction element record matching its counterpart in the other log file will likely be found.

BACKGROUND

Databases are routinely upgraded to new versions, or new software patches are applied on existing versions, or the database is migrated to a new database management system. In each of these situations, it is common to compare the performance of a benchmark transaction workload in the new database environment to the same benchmark transaction workload in the old database environment. A benchmark transaction workload is typically a sequence of different transaction types. In a typical database environment, each transaction, for example, is a sequence of one or more Structured Query Language (SQL) statements. To compare the performances of the benchmark transaction workloads, corresponding instances of transactions in the new and old database environments are matched.

Typically, database transactions are multi-level transactions. That is, each transaction can include several SQL statements. In addition, while the SQL log records of a transaction will usually appear in the proper order in a database transaction log file, the database operation records from multiple transactions can be intermixed. Further, the different executions of a transaction workload will typically result in different sequences of database operation log file records. These factors can complicate matching of transactions between database transaction log files.

SUMMARY

Embodiments of the present invention disclose a method, computer program product, and system for determining a log file match window. First and second log files contain operation records recording executions of operations of a transaction workload. Each log file records a respective execution of the transaction workload. Matching operation records between the log files are not necessarily in the same relative record locations or the same sequence. A predefined number of matches is identified between operation records in the first file and operation records in the second file. Each match is identified when a match to an operation record in the first file is found in the second file within a current defined range of record positions relative to the record position of the operation record in the first file. For the predefined number of matches, determine the span of the actual range of record positions in the second file relative to the positions of the operation records in the first file within which all matches were found. If the span of the actual range of record positions is smaller than the span of the current defined range of record positions by at least a first threshold value, decrease the span of the current defined range of record positions. If the span of the actual range of record positions is within a second threshold value of the span of the current defined range of record positions, increase the span of the current defined range of record positions. And if an amount above a third threshold value of operation records in the first file are not matched to operation records in the second file, increasing the span of the current defined range of record positions.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the invention operate within an environment in which transactions in a first log file, the "replay" log file, are matched to transactions in a second log file, the "capture" file. In a preferred embodiment, matching logic steps down both log files substantially synchronously, and for each transaction record in the replay file, attempts to identify the corresponding record in the capture file. Because the two log files will typically not align record for record, a match window is defined in the capture file, relative to each record in the replay file, within which a match to the replay record is expected to be found. If the match window is very large, the likelihood of finding a match to a capture file record within the match window of the replay file is high. However, the computing resources required to perform the matching logic and maintain the large match window will be correspondingly high. If the match window is small, the computing resources required to perform the matching logic and maintain the small match window will be correspondingly small, but the likelihood of finding a match within the match window may be unacceptably low. Embodiments of the invention are directed to dynamically adjusting the match window, as matching operations progress, to satisfy a predetermined acceptable likelihood.

An exemplary environment in which the present invention may operate is described in U.S. patent application Ser. No. 13/483,778 to Agarwal, et al. ("Agarwal, et al."), which is hereby incorporated by reference in its entirety. A preferred embodiment of the present invention will be described herein in the context of an environment similar to the one described in Agarwal, et al. However, the present invention is not limited to operating in such an environment and may be utilized wherever matching records are to be identified between files, subject to certain constraints and assumptions which may include ones described herein.

Embodiments of the present invention will now be described in detail with reference to the accompanying drawings.

Figure 1:
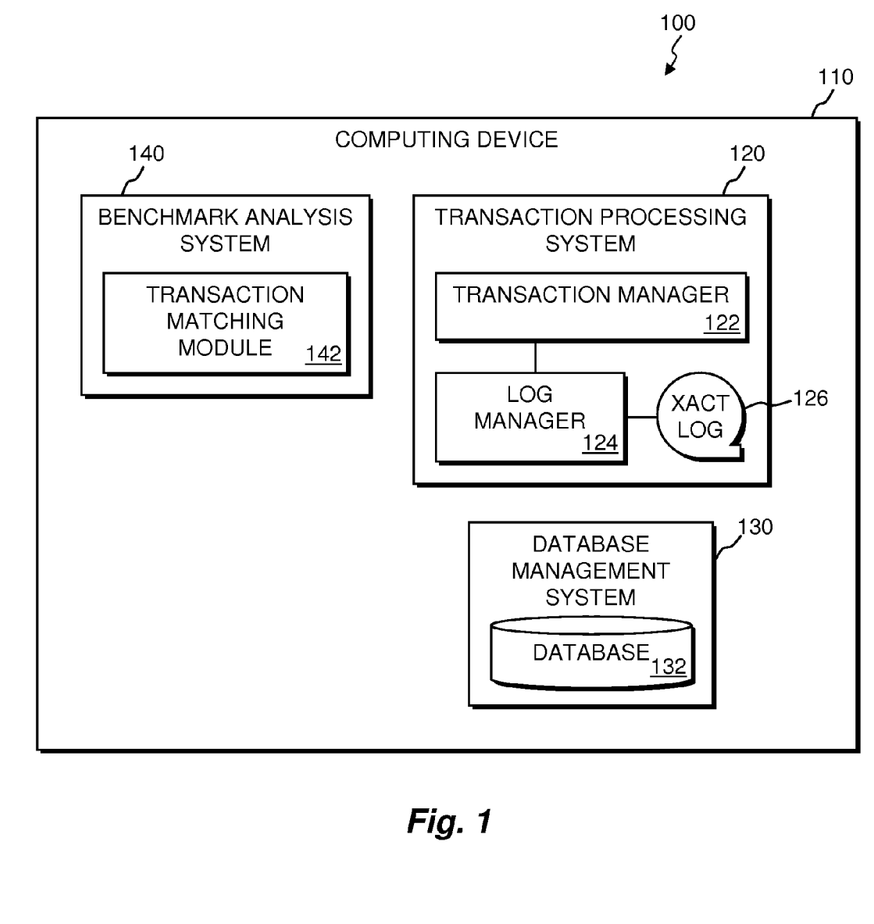
FIG. 1 is a functional block diagram of a transaction matching system in accordance with an embodiment of the present invention.

FIG. 1 is a functional block diagram illustrating a transaction matching system 100 in accordance with an embodiment of the present invention. Transaction matching system 100 includes user computing device 110, which further includes transaction processing system 120, database management system 130, and benchmark analysis system 140.

In preferred embodiments of the invention, user computing device 110 can be, for example, a mainframe or mini computer, a laptop, or netbook personal computer (PC), or a desktop computer. Transaction matching system 100 is shown as being wholly implemented on user computing device 110. However, transaction matching system 100 may operate in a distributed environment in which one or more of its components are implemented across a plurality of computing devices that communicate over a network, such as a local area network (LAN) or a wide area network (WAN) such as the Internet. For example, benchmark analysis system 140 may operate on a separate computing device. In general, transaction matching system 100 can execute on any computing device 110, or combination of computing devices, satisfying desired implementation requirements, and as described in relation to FIG. 4.

Transaction processing system 120 includes transaction manager 122, log manager 124, and transaction log file 126. Transaction manager 122 manages the processes that execute transactions against database 132 via database management system 130. Transaction manager 122 also manages all transactions so as to maintain data consistency in database 132. This is accomplished through the use of log manager 124. Log manager 124, among its other activities, records each transaction operation of a transaction workload, such as the execution of SQL statements in a transaction, in a transaction operation record to transaction log file 126.

Figure 4:
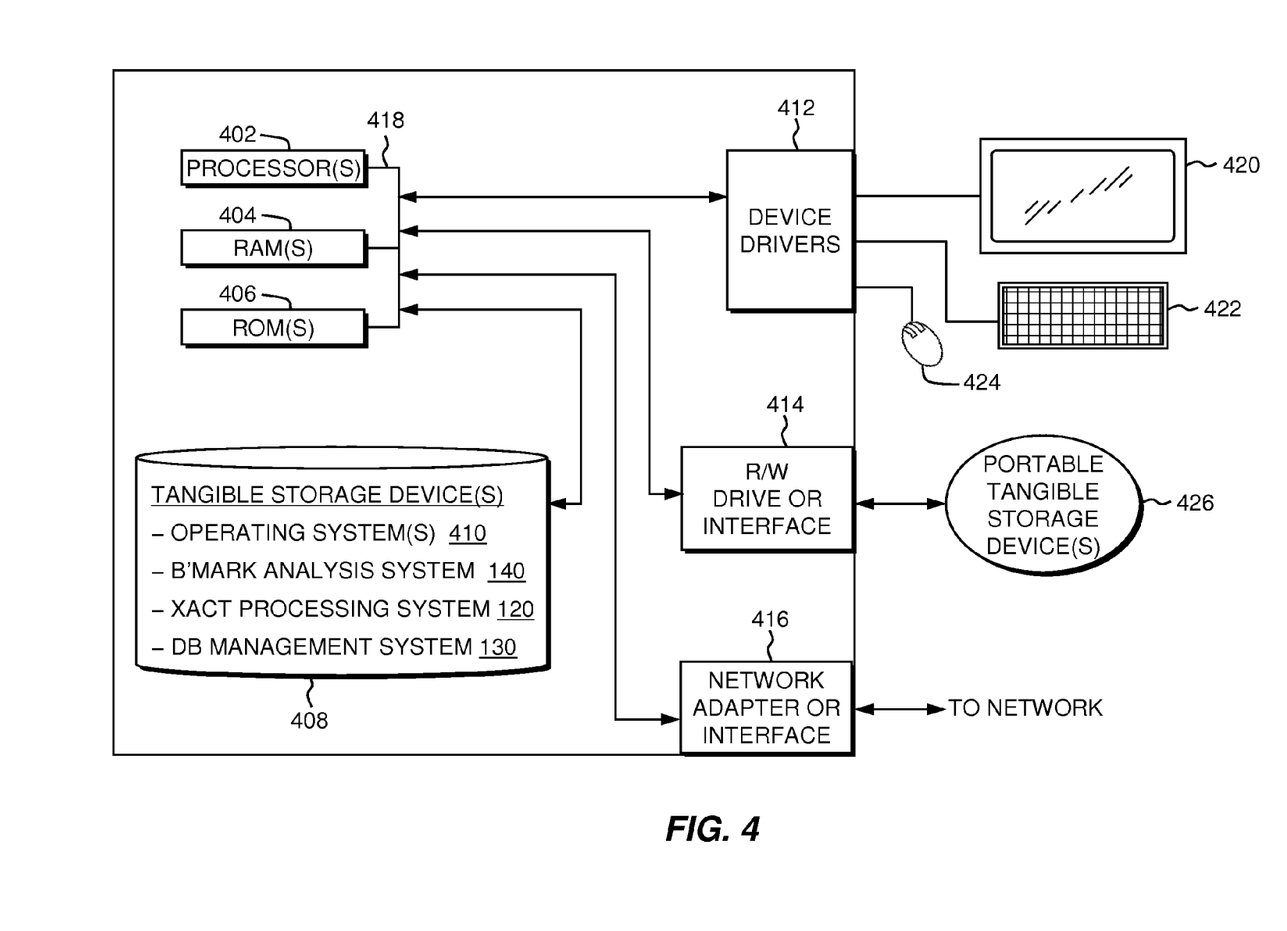
FIG. 4 is a block diagram of hardware and software within the user computing device of FIG. 1, in accordance with an embodiment of the present invention.

Database management system 130 includes database 132, which may reside, for example, on tangible storage device(s) 408 (see FIG. 4). Database management system 130 manages access to database 132, and manages the resources associated with database 132, such as disk space.

Benchmark analysis system 140 operates generally to analyze different executions of a benchmark transaction workload, and provide systems and applications programmers and systems administrators information to determine, for example, the most efficient organization of a database 132, or of a transaction workload, or for determining the most efficient database management system 130 or transaction processing system 120. The information that benchmark analysis system 140 processes is derived from one or more transaction log files 126. For example, the transaction log file 126 information pertaining to two different executions of a benchmark transaction workload are stored on disk, such as tangible storage device 408, after each benchmark workload completes, and this information is made available to benchmark analysis system 140 for analysis.

Benchmark analysis system 140 includes transaction matching module 142. Transaction matching module 142, the operation of which will be described in more detail below, operates generally to identify matching transactions between different executions of a benchmark transaction workload. These matching transactions are then analyzed by benchmark analysis system 140 to provide the information stated above.

Embodiments of the invention are described with respect to the components and their functionality as presented in FIG. 1. Other embodiments of the invention may perform the invention as claimed with different functional boundaries between components. For example, the functionality of transaction matching module 142 may be implemented as a standalone component, or as a function of transaction processing system 120.

In embodiments of the invention, various constraints and assumptions apply. One constraint is that although the same benchmark transaction workload may be executed twice in the same database environment, or different database environments, the transaction log files 126 of these executions may be different for several reasons. For example, the SQL records for transactions executed sequentially may be interleaved in a different order in different executions of the same transaction workload. There may also be other transaction workloads executing on the database systems that produce extraneous log records that will be intermixed in the transaction log file 126 with the benchmark transaction workload records.

One operating assumption is that a record in the replay file will find a match in the capture file, if there is a match, within a certain range or "match window". This assumption serves to recognize that records can be out of order between the capture and replay files, and that there may be extraneous records in the replay file for which there is no matching record in the capture file, and vice-versa. The assumption also serves to limit, or bound, the number of compare operations and thus limit the computer resources consumed by the compares. The trade-off for this assumption is that if there is a capture record outside of the match window that does match the current replay record, this match will not be found and the replay record will be flagged as extraneous. Similarly, it is assumed that a record in the capture file will find a match in the replay file, if there is a match, within the same range or "match window" of replay file records.

Another assumption is that all SQL records for a transaction will appear in a transaction log file 126 in the order of execution within the transaction, even though the SQL records of one transaction may be interleaved with the SQL records of another transaction. Thus, if an end-of-transaction SQL record appears in transaction log file 126, then no other SQL record for this transaction will appear in the transaction log file following the end-of-transaction record.

A benchmark transaction workload typically includes a sequence of database transactions. Each database transaction will typically comprise, for example, a sequence of SQL statements. When a series of database transactions are executed, for example, by transaction processing system 120, the SQL statements of a transaction are typically executing in an interleaved manner with the SQL statements of other database transactions of the benchmark transaction workload. Thus, although the database transactions may execute in sequence, their underlying SQL statements can be interleaved with SQL statements of other transactions, and the corresponding transaction log file 126 records will be similarly interleaved. Further, different executions of the same benchmark transaction workload can produce different execution sequences of the underlying SQL transactions. This could be due to such factors as I/O scheduling by the operating system, I/O delay, network delay, locking and latching within the database, etc. Although the execution of the underlying SQL statements of different transactions may be interleaved, the SQL statements in a given transaction will execute in order, and will appear in the transaction log file 126 in order.

A benchmark transaction log file 126 may also contain extraneous SQL records. These are records in the capture file that cannot be matched to records in the replay file, and vice-versa. Extraneous records may result from transactions executing in a database environment that are not part of the benchmark transaction workload.

With respect to SQL statement matching, each SQL statement is considered an ordered sequence of tokens. SQL records in the transaction log files 126 are compared token by token rather than comparing SQL records as complete character strings. A SQL token is a word or character that can be identified meaningfully when the SQL statement is parsed, or interpreted. For example, each token can typically be considered a keyword, an identifier, a quoted identifier, a constant, or one of several special character symbols. SQL statement clauses can include several tokens. Token by token comparisons allow for meaningful determinations of partial matches, and identifications of complete matches, even though not all corresponding token values are identical. For example, there might be some differences in the host variables between log files. If the only difference between two SQL record is differences in the host variables, this could be considered a high-scoring partial match. In preferred embodiments of the invention, token matching is done in a Boolean manner, i.e., either a pair of corresponding tokens match exactly or they don't match at all. For instance, there is no partial matching between two tables named "Order" and "Orders". This token based string comparison also helps to remove the differences that arise due to change in comments, change in schema name, etc. For example, comments can be ignored or stripped from the record during the compare step.

An assumption with regard to SQL record matching is that if a replay SQL record partially matches a capture SQL record, and the SQL record includes multiple host variables, then at least one of the host variables in the matching records should match. This assumption is one way to increase the likelihood that a partial match between a replay transaction and a capture transaction with a match score above the match score threshold is in fact an actual match. If the potentially matching records do not have a common host variable, then a mismatch is declared.

In preferred embodiments of the invention, the similarity between two SQL records is determined by assigning a numerical value to a match score. For example, if all tokens of a SQL record match those of another, the match score is 1. If no tokens match, the match score is 0. If the first token, which will typically be the statement or command type, doesn't match, then the entire record may be considered as not matching. A partial match score can be based, for example, on the percentage of tokens that match. If most tokens match, except for host variable tokens, a percentage increase may be added to the match score. In preferred embodiments a match score threshold is defined, below which a mismatch is declared. For example, a match threshold of 80% may be defined. Because a transaction workload often involves repeating sequences of transactions, it is possible that a replay file record may partially match more than one capture file record with a match score above the mismatch threshold.

With respect to transaction matching generally, a capture transaction will match a replay transaction if all the SQL records of the capture transaction match all the SQL records of the replay transaction. However, as stated above, partial matching of SQL records is possible. Thus, if a replay transaction has more than one potential matching capture transaction, the capture transaction with the highest match score is considered the best match. For example, the capture transaction having the greatest sum of SQL record match scores with relation to a specific replay transaction is considered the best candidate for a transaction match.

As mentioned above, embodiments of the invention use a match window as an assumption to limit the number of records that are compared in the capture file to a replay file record. The capture file match window is expressed as a 2K+1 window, where K is the number of records searched before and after the capture file record that corresponds to the replay record that is being matched. For example, if capture records having log file index locations 80 to 120 are searched for a match to a replay record at log file index location 100, K equals 20 and the match window is 41 records. Generally, embodiments of the invention step down the replay file one record at a time, and search the corresponding match window in the capture file for matching records. If a matching capture file record is not found in the match window, the replay record is marked as extraneous. If the match window advances beyond a capture file record that has not been matched, the capture file record is considered extraneous. In certain embodiments of the invention, the match window is not centered on the corresponding record number of the record being read in the replay file, but is a fixed offset number of records away. In a preferred embodiment, the match window is implemented as a circular buffer with a length of 2K+1.

Embodiments of the invention are directed to dynamically adjusting the match window size, by either increasing or decreasing the window size. In a preferred embodiment, the match window is initially set to a predetermined number, or span, of records such that the likelihood of finding a match to a replay file record within the match window of the capture file is high. This predetermined number of records will typically be much larger than the approximate window size that is dynamically converged to. Then, after each set of a predetermined number of matches is found between the log files, the maximum distance in records between matching records in the set is determined, and the window size, or span, is adjusted based on this maximum distance. If a sudden increase in the number of unmatched records in the capture file as a percentage of capture records read is detected, this may indicate that the current match window size is too small, and the window size can be increased. This is described in more detail below.

Figure 2:
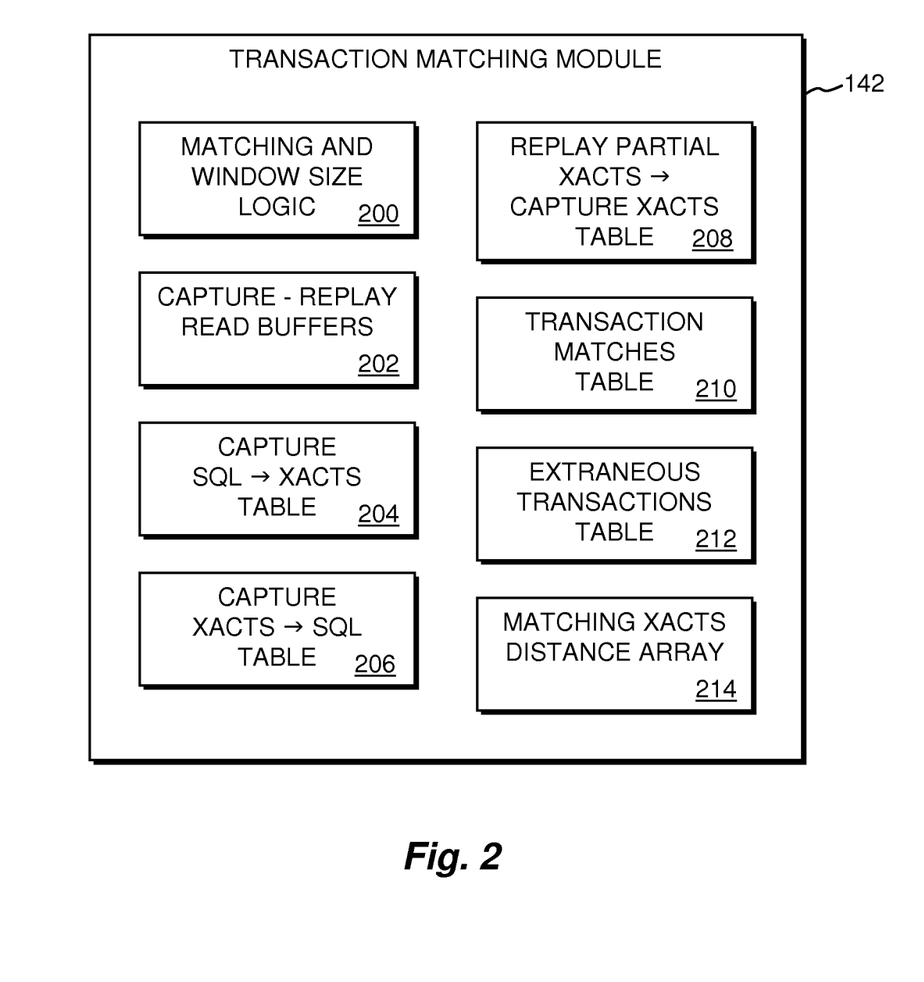
FIG. 2 is a block diagram of a transaction matching module in a benchmark analysis system of the transaction matching system of FIG. 1, in accordance with an embodiment of the present invention.

FIG. 2 is a block diagram of transaction matching module 142 in benchmark analysis system 140 of transaction matching system 100, in accordance with an embodiment of the present invention. Transaction matching module 142 includes matching and window size logic module 200, capture and replay file read buffers 202, capture file SQL-to-transactions table 204, capture file transactions-to-SQL table 206, replay file partial transactions to capture file transactions table 208, transaction matches table 210, extraneous transactions table 212, and matching transactions distance array 214. Matching and window size logic module 200 can contain programming code, firmware logic, hardware, or a combination of these, to control the operations associated with performing the transaction matching operations, including the dynamic match window size adjustment.

Capture and replay file read buffers 202 include the storage into which the capture file and replay file transaction SQL records are read. In a preferred embodiment, these buffers reside in memory, for example RAM 404, to allow for quick access and manipulation, and are typically implemented as circular buffers. Because the replay file records are processed sequentially and individually, the replay file read buffer does not need to be very long and may be implemented as a single entry buffer. The capture file read buffer should be at least as long as the longest anticipated match window size. In practice, the longest match window size will typically be the initial match window size.

Capture file SQL-to-transactions table 204 will include an entry that maps each SQL record to the transaction to which it belongs as each SQL record is read from the capture log file 126. Similarly, capture file transactions-to-SQL table 206 will include an entry that maps each transaction to its SQL records as each SQL record is read from the capture log file. As will be described in more detail below, these tables may be used in the mapping of partially read replay file transactions to potential capture file transactions, and, for the SQL records of a capture file transaction that have been read, to identify and flag as extraneous the rest of the records of the transaction when one SQL record of the transaction has been identified as extraneous.

Replay partial transactions to capture transactions table 208 is used by matching and window size logic module 200 to associate partially read replay transactions to potentially matching capture file transactions. Each entry in the table contains a replay transaction identifier and the replay transaction's SQL records read so far, and a capture transaction identifier and the capture transaction's SQL records read so far. For example, a non-end-of-transaction capture file SQL record has been read and is the only capture SQL record of its transaction read so far. A non-end-of-transaction replay file SQL record having the same SQL record type as the capture file SQL record is read. In this scenario, the partial capture file transaction may be a match of the partial replay file transaction, based on their match of SQL record types, and an entry will be added to replay partial transactions to capture transactions table 208 mapping the partial replay file transaction to the partial capture file transaction. As additional capture file and replay file SQL records are read that belong to these respective transactions, the entry for this mapping will be updated until the replay transaction and a capture transaction cannot match. For example, although the first SQL records read for each of the two transactions are the same type, the second SQL records of the transactions may be of different types. When a match is no longer possible, the non-matching capture transaction identifier and its SQL records are removed from the entry. If the non-matching capture transaction identifier was the only capture transaction identifier in the entry, the entire entry is removed from replay file partial transactions to capture file transactions table 208. Because entries in this table are added based on SQL type, it is possible to have more than one potentially matching capture transaction for a replay transaction, even if all SQL records of the transactions have been read.

Transaction matches table 210 is used to record instances where a capture transaction is identified as matching a replay transaction. As mentioned above, determining a transaction match is performed at the SQL record token level. A capture transaction that in fact corresponds to a replay transaction may not have a complete match of all tokens due to differences in, for example, host variables. Thus, a match between a capture transaction and a replay transaction is declared if the SQL record tokens have a match score above the match score threshold. The match having the highest match score above the match score threshold is identified as a match.

Extraneous transactions table 212 is used in certain embodiments to record transactions in the capture log file 126 for which no matching transactions are found in the replay log file 126, and vice versa. In these embodiments, the transaction identifier of each capture file and replay file SQL record that is read is compared against entries in this table. If there is a match, the log file record can be ignored. A transaction in the replay log file 126 will be considered extraneous if a replay SQL record belonging to the transaction does not find a match in the capture file match window having a match score above the match score threshold value. When a replay transaction is identified as extraneous, all references to the transaction are removed from replay partial transactions to capture transactions table 208. A transaction in the capture log file 126 will be considered extraneous if a capture SQL record belonging to the transaction is not matched to a replay SQL record while the capture SQL record is in the capture file match window, for example, in the active 2K+1 portion of the capture file read buffer 202 and has not been overwritten. When a capture transaction is identified as extraneous, entries that reference the transaction are cleared from capture file SQL-to-transactions table 204, capture file transactions-to-SQL table 206, and replay partial transactions to capture transactions table 208. For embodiments that use extraneous transactions table 212, an entry is added to this table.

Matching transactions distance array 214 is used by matching and window size logic module 200 in determining match window size. In a preferred embodiment, the transaction workload replay and capture file records are first aligned with each other based on, for example, benchmark transaction workload start times. In a controlled database environment in which the benchmark transaction workloads are the only workloads, alignment may be based on the first benchmark transaction workload SQL records in the capture and replay log files. The log file index numbers of the SQL records of the transaction workloads are also normalized. For example, the first SQL record after the transaction workload start time in each file is normalized to an index number of one.

In a preferred embodiment, matching transactions distance array 214 includes an entry that contains the current capture file match window K value, and another entry that contains the maximum actual K value determined from a predefined number of SQL record matches between the replay and capture files. As the first SQL record match of the predefined number of SQL record matches is found, the maximum actual K value entry is set to an initial value, for example, a minimum acceptable K value, or zero. As each transaction match is declared, resulting in the match being recorded in transaction matches table 210, the positive difference in index numbers, for example, the magnitude, or absolute value, of the difference, of each corresponding SQL record of the matching transaction is recorded in the maximum actual K value entry if the positive difference is greater than the current maximum actual K value entry.

When the actual maximum K value has been determined for a predefined number of SQL record matches, a predefined number of transaction matches, or a combination of the two, between the replay and capture files, for example, 500 SQL record matches, or 100 transaction matches, the current capture file match window K value is adjusted, if indicated. In a preferred embodiment, three adjustments are defined. A gross adjustment if there is a large difference between the actual maximum K value and the current K value, a fine tuning adjustment if there is a relatively small difference, and an increase adjustment if the percentage of unmatched transactions is at an unacceptable level. Any adjustment to the current capture file match window K will result in an adjustment to the capture file match window, which is accomplished by adjusting the active 2K+1 portion of the capture file read buffer in capture and replay file read buffers 202.

For the gross adjustment, if the actual maximum K value is, for example, less than one-half the current capture file match window K value, then the current capture file match window K value can be set to, for example, 125% of the of the actual maximum K value. This adjustment may be required for the first adjustment to the initial window size value. For the fine adjustment, if the actual maximum K value is, for example, within 10% of the current capture file match window K value, then the current capture file match window K value can be set to, for example, 115% of the of the actual maximum K value.

A third adjustment can be made if the percentage of unmatched transactions is at an unacceptable value. The percentage of unmatched records can be determined, for example, by comparing the number of capture file transactions declared as extraneous to the number of entries added to transaction matches table 210 during an analysis period. In a controlled environment in which the only transaction workloads recorded in the log files are the benchmark transaction workloads, the acceptable percentage of unmatched transactions can be set to a low value, for example, 2%. In an environment in which there may be a high number of extraneous records in the log files interspersed among the benchmark transaction workloads, the acceptable percentage of unmatched transactions can be set to a higher value.

In another embodiment, each matching transactions distance array 214 entry contains the two index numbers of the corresponding SQL records of the matching transactions recorded in transaction matches table 210. In this embodiment, the array is implemented as a circular buffer with a length equal to the predefined number of SQL matches over which analysis is desired. Analysis of the information in the array can take place as the buffer is rewritten.

In this embodiment, more in-depth statistical analysis can be performed. For example, rather than assuming a record offset of zero between the capture and replay files relative to the aligned and normalized respective index numbers, an offset based on a statistical analysis of all the offsets, such as the average offset, can be determined, and a match window based on, for example, the standard deviation of the distribution of positive and negative matching SQL record distances, can de determined. Generally, for example, a span and offset can be determined by performing an analysis of a statistical distribution of the relative offsets to calculate a mean value of the distribution, and basing the span on a statistical measure of the dispersion about the mean, for example, the variance or standard deviation.

Figure 3A:
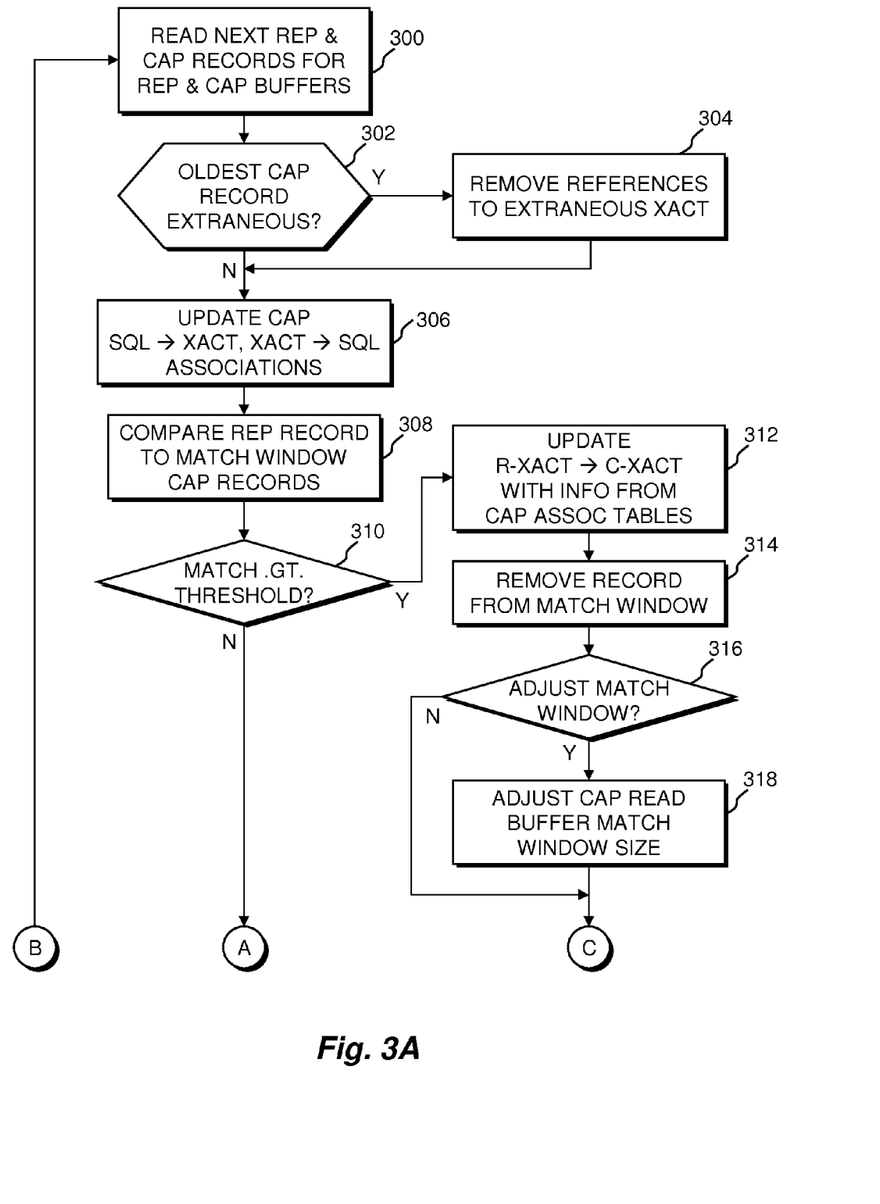
FIGS. 3A and 3B are a flowchart depicting the steps of a transaction matching algorithm, in accordance with an embodiment of the present invention.
Figure 3B:
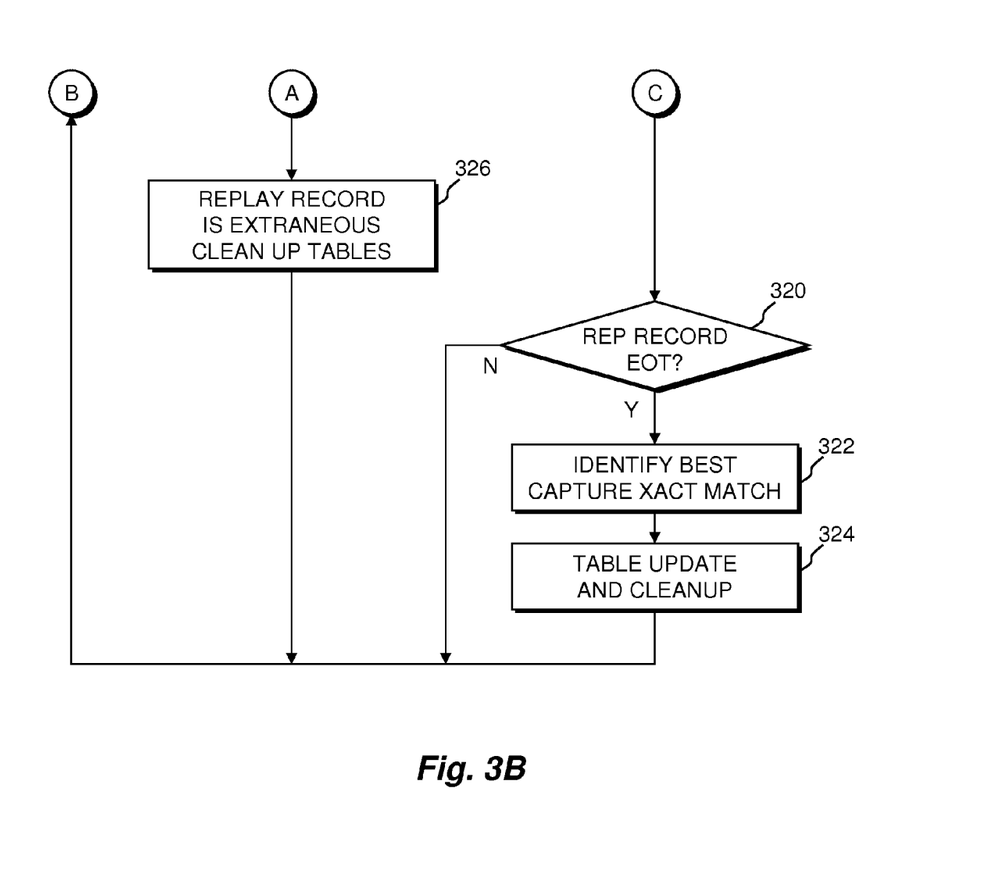

FIGS. 3A and 3B are a flowchart depicting the steps of a transaction matching algorithm, in accordance with an embodiment of the present invention. In the preferred embodiment, the algorithm begins with matching and window size logic module 200 advancing the address pointer for capture file read buffer 202, reading the next replay record from the replay record log file 126 into replay read buffer 202, and the next capture record from the capture log file 126 for recording into the capture read buffer 202 (step 300). As mentioned above, the active portion of capture read buffer 202 has a length equal to the current match window length of 2K+1. For the first iteration of the algorithm, the first K+1 records are read into capture read buffer 202. After the first K iterations, the capture read buffer 202 will have a full match window of capture log file records.

When the address pointer for capture file read buffer 202 is advanced (see step 300), a determination is made whether the capture file read buffer 202 entry indicated by the address pointer is extraneous (decision step 302). In a preferred embodiment, if the indicated entry contains a SQL record, then the capture transaction to which the SQL record belongs is considered extraneous. As described below, when a capture SQL record within the match window is matched to a replay record, among other actions, the entry in capture read buffer 202 containing the matched SQL record is cleared (see step 314). Thus, if a capture file read buffer 202 entry indicated by the address pointer contains a SQL record, this indicates that the address pointer has come full circle relative to the buffer, and a matching replay file SQL record was not found within 2K+1 replay file records. Because one of the operating assumptions is that a SQL record in the capture file will have a matching record in the replay file, if one exists, within 2K+1 replay file records, the address pointer pointing to an entry containing a SQL record indicates that no match was found, and the transaction to which the SQL record belongs is extraneous.

If the capture file read buffer 202 entry indicated by the address pointer is extraneous (decision step 302, "Y" branch), then entries referencing the capture file transaction are cleared from capture file SQL-to-transactions table 204, capture file transactions-to-SQL table 206, and replay partial transactions to capture transactions table 208 (step 304). For embodiments that use extraneous transactions table 212, an entry is added to this table. The just-read capture log file 126 SQL record is then written to the capture file read buffer 202 entry indicated by the address pointer. The capture file SQL-to-transactions table 204 and capture file transactions-to-SQL table 206 are then updated with information from the just-read capture log file 126 SQL record (step 306).

The just-read replay file SQL record is then compared to the capture file SQL records in the match window of capture file read buffer 202 (step 308). If a capture file SQL record in the match window is found with a match score greater than the match score threshold value (decision step 310, "Y" branch), indicating at least a partial match, then replay partial transactions to capture transactions table 208 is updated (step 312), and the entry in capture file read buffer 202 containing the matching capture SQL record is cleared (step 314).

Matching and window size logic module 200 then determines if the predefined number of matches have occurred which will trigger an adjustment to the capture file read buffer 202 match window length (decision step 316). If the predefined number of matches has occurred (decision step 316, "Y" branch), then the capture file read buffer match window length is adjusted, as described above (step 318).

If the matching replay record is an end-of-transaction record (decision step 320, "Y" branch), then the best match between the replay transaction to which the end-of-transaction record belongs, and the potential capture transaction matches to this replay transaction contained in replay partial transactions to capture transactions table 208 is determined (step 322). The best transaction match is recorded in transaction matches table 210, and references to the matching replay and capture file transactions are removed from all tables (step 324). Processing then continues with the next replay file and capture file records (step 300).

If a capture file SQL record in the match window is not found with a match score greater than the match score threshold value (decision step 310, "N" branch), then the replay record is considered extraneous, and all references to the replay record and the transaction to which it belongs are removed from replay partial transactions to capture transactions table 208 (step 326). Processing then continues with the next replay file and capture file records (step 300).

FIG. 4 depicts a block diagram of components of the computing device 110 of transaction matching system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 can include one or more processors 402, one or more computer-readable RAMs 404, one or more computer-readable ROMs 406, one or more tangible storage devices 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within a system.

One or more operating systems 410, benchmark analysis system 140, transaction processing system 120, and database management system 130 are stored on one or more of the computer-readable tangible storage devices 408 for execution by one or more of the processors 402 via one or more of the respective RAMs 404 (which typically include cache memory). In the illustrated embodiment, each of the computer-readable tangible storage devices 408 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 can also include a R/W drive or interface 414 to read from and write to one or more portable computer-readable tangible storage devices 426. Benchmark analysis system 140, transaction processing system 120, and database management system 130 on computing device 110 can be stored on one or more of the portable computer-readable tangible storage devices 426, read via the R/W drive or interface 414 and loaded into the respective computer-readable tangible storage device 408.

Computing device 110 can also include a network adapter or interface 416, such as a TCP/IP adapter card or wireless communication adapter (such as a 4G wireless communication adapter using OFDMA technology). Benchmark analysis system 140, transaction processing system 120, and database management system 130 on computing device 110 can be downloaded to the computing device from an external computer or external storage device via a network (for example, the Internet, a local area network or other, wide area network or wireless network) and network adapter or interface 416. From the network adapter or interface 416, the programs are loaded into the computer-readable tangible storage device 408. The network may comprise copper wires, optical fibers, wireless transmission, routers, firewalls, switches, gateway computers and/or edge servers.

Computing device 110 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 can comprise hardware and software (stored in computer-readable tangible storage device 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and program product have been disclosed for a presentation control system. However, numerous modifications and substitutions can be made without deviating from the scope of the present invention. Therefore, the present invention has been disclosed by way of example and not limitation.

What is claimed is:

1. A method for determining a file match window, first and second files contain operation records recording executions of operations of a transaction workload, each file recording a respective execution of the transaction workload, matching operation records between the files not necessarily in the same relative record locations or the same sequence, the method comprising:

identifying, by a computer, a predefined number of matches between operation records in the first file and operation records in the second file, each match identified when a match to an operation record in the first file is found in the second file within a current defined range of record positions relative to the record position of the operation record in the first file;

determining, by a computer, for the identified matches, the span of the actual range of record positions in the second file relative to the positions of the operation records in the first file within which all matches were found;

in response to determining that the span of the actual range of record positions is smaller than the span of the current defined range of record positions by at least a first threshold value, decreasing the span of the current defined range of record positions;

in response to determining that the span of the actual range of record positions is within a second threshold value of the span of the current defined range of record positions, increasing the span of the current defined range of record positions; and in response to determining that an amount above a third threshold value of operation records in the first file are not matched to operation records in the second file, increasing the span of the current defined range of record positions.

2. A method in accordance with claim 1, wherein determining the span of the actual range of record positions in the second file comprises determining a statistical measure of the dispersion about the mean value of a statistical distribution of the actual range of record positions in the second file.

3. A method in accordance with claim 1, wherein the current defined range of record positions in the second file is a range of record positions centered about a record position in the second file corresponding to the record position of the operation record in the first file;

wherein determining the span of the actual range of record positions in the second file comprises determining twice the maximum magnitude of the difference in record positions between the current defined range center record position in the second file and the record positions of operation records in the second file that match an operation record in the first file, plus one; and wherein increasing and decreasing the span of the current defined range of record positions comprises increasing and decreasing, respectively, the current defined range of record positions by an equal number of record positions at the high end and low end of the current defined range of record positions.

4. A computer program product for determining a file match window, first and second files contain operation records recording executions of operations of a transaction workload, each file recording a respective execution of the transaction workload, matching operation records between the files not necessarily in the same relative record locations or the same sequence, the computer program product comprising:

one or more computer-readable storage media and program instructions stored on the one or more computer-readable storage media, the program instructions comprising:

program instructions to identify a predefined number of matches between operation records in the first file and operation records in the second file, each match identified when a match to an operation record in the first file is found in the second file within a current defined range of record positions relative to the record position of the operation record in the first file;

program instructions to determine, for the identified matches, the span of the actual range of record positions in the second file relative to the positions of the operation records in the first file within which all matches were found;

program instructions, in response to determining that the span of the actual range of record positions is smaller than the span of the current defined range of record positions by at least a first threshold value, to decrease the span of the current defined range of record positions;

program instructions, in response to determining that the span of the actual range of record positions is within a second threshold value of the span of the current defined range of record positions, to increase the span of the current defined range of record positions; and program instructions, in response to determining that an amount above a third threshold value of operation records in the first file are not matched to operation records in the second file, to increase the span of the current defined range of record positions.

5. A computer program product in accordance with claim 4, wherein the program instructions to determine the span of the actual range of record positions in the second file comprises program instructions to determine a statistical measure of the dispersion about the mean value of a statistical distribution of the actual range of record positions in the second file.

6. A computer program product in accordance with claim 4, wherein the current defined range of record positions in the second file is a range of record positions centered about a record position in the second file corresponding to the record position of the operation record in the first file;

wherein program instructions to determine the span of the actual range of record positions in the second file comprises program instructions to determine twice the maximum magnitude of the difference in record positions between the current defined range center record position in the second file and the record positions of operation records in the second file that match an operation record in the first file, plus one; and wherein program instructions to increase and decrease the span of the current defined range of record positions comprises program instructions to increase and decrease, respectively, the current defined range of record positions by an equal number of record positions at the high end and low end of the current defined range of record positions.

7. A computer system for determining a file match window, first and second files contain operation records recording executions of operations of a transaction workload, each file recording a respective execution of the transaction workload, matching operation records between the files not necessarily in the same relative record locations or the same sequence, the computer system comprising:

one or more computer processors, one or more computer-readable storage media, program instructions stored on the computer-readable storage media for execution by at least one of the one or more processors, the program instructions comprising:

program instructions to identify a predefined number of matches between operation records in the first file and operation records in the second file, each match identified when a match to an operation record in the first file is found in the second file within a current defined range of record positions relative to the record position of the operation record in the first file;

program instructions to determine, for the identified matches, the span of the actual range of record positions in the second file relative to the positions of the operation records in the first file within which all matches were found;

program instructions, in response to determining that the span of the actual range of record positions is smaller than the span of the current defined range of record positions by at least a first threshold value, to decrease the span of the current defined range of record positions;

program instructions, in response to determining that the span of the actual range of record positions is within a second threshold value of the span of the current defined range of record positions, to increase the span of the current defined range of record positions; and program instructions, in response to determining that an amount above a third threshold value of operation records in the first file are not matched to operation records in the second file, to increase the span of the current defined range of record positions.

8. A computer system in accordance with claim 7, wherein the program instructions to determine the span of the actual range of record positions in the second file comprises program instructions to determine a statistical measure of the dispersion about the mean value of a statistical distribution of the actual range of record positions in the second file.

9. A computer system in accordance with claim 7, wherein the current defined range of record positions in the second file is a range of record positions centered about a record position in the second file corresponding to the record position of the operation record in the first file;

wherein program instructions to determine the span of the actual range of record positions in the second file comprises program instructions to determine twice the maximum magnitude of the difference in record positions between the current defined range center record position in the second file and the record positions of operation records in the second file that match an operation record in the first file, plus one; and wherein program instructions to increase and decrease the span of the current defined range of record positions comprises program instructions to increase and decrease, respectively, the current defined range of record positions by an equal number of record positions at the high end and low end of the current defined range of record positions.

\* \* \* \* \*